United States Patent
Chang et al.

(10) Patent No.: US 7,060,376 B1
(45) Date of Patent: *Jun. 13, 2006

(54) AMORPHOUS SOFT UNDERLAYERS FOR PERPENDICULAR RECORDING MEDIA

(75) Inventors: Chung-Hee Chang, Fremont, CA (US); Rajiv Y. Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,155

(22) Filed: May 10, 2002

Related U.S. Application Data (60) Provisional application No. 60/338,447, filed on Dec. 6, 2001, provisional application No. 60/338,372, filed on Dec. 6, 2001.

(51) Int. Cl.
*G11B 5/66* (2006.01)
*G11B 5/70* (2006.01)
(52) U.S. Cl. ...................... 428/832; 427/131
(58) Field of Classification Search .......... 428/694 TS, 428/694 TM, 900, 336, 213, 332, 832, 827, 428/828; 427/130, 131
See application file for complete search history.

(56) References Cited

U.S. PATENT DOCUMENTS

| | | | |
|---|---|---|---|
| 4,576,700 A * | 3/1986 | Kadokura et al. | 204/192.15 |
| 4,722,869 A * | 2/1988 | Honda et al. | 428/611 |
| 5,830,569 A | 11/1998 | Hikosaka et al. | 428/332 |
| 6,146,775 A | 11/2000 | Fujita et al. | 428/692 |
| 6,174,597 B1 | 1/2001 | Yusu et al. | 428/332 |
| 6,221,508 B1 | 4/2001 | Kanbe et al. | 428/617 |
| 6,395,413 B1 * | 5/2002 | Ando | 428/694 T |
| 6,562,453 B1 * | 5/2003 | Futamoto et al. | 428/332 |
| 6,686,070 B1 * | 2/2004 | Futamoto et al. | 428/827 |
| 2001/0038932 A1 * | 11/2001 | Uwazumi et al. | 428/694 TS |
| 2002/0034666 A1 * | 3/2002 | Kiely | 428/694 TS |
| 2002/0048693 A1 * | 4/2002 | Tanahashi et al. | 428/694 TS |
| 2003/0091868 A1 * | 5/2003 | Shimizu et al. | 428/694 TM |
| 2003/0104247 A1 * | 6/2003 | Girt | 428/693 |
| 2003/0108776 A1 * | 6/2003 | Chang et al. | 428/694 TM |

FOREIGN PATENT DOCUMENTS

JP    4-153910    5/1992

* cited by examiner

*Primary Examiner*—Holly Rickman
(74) *Attorney, Agent, or Firm*—Morrison & Foerster LLP (57) ABSTRACT

A perpendicular magnetic recording medium having a substrate, an amorphous soft underlayer and a magnetic layer for perpendicular recording has reduced DC noise and surface roughness, which reduces the head-to-media spacing and the head-to-amorphous soft underlayer spacing.

15 Claims, 8 Drawing Sheets

← Protective overcoat 23

← Magnetic layer 22

← Underlayer 21

← Substrate 20

← Underlayer 21'

← Magnetic layer 22'

← Protective overcoat 23'

AMORPHOUS SOFT UNDERLAYERS FOR PERPENDICULAR RECORDING MEDIA

RELATED APPLICATIONS

This application claims priority from Provisional Application Ser. No. 60/338,447 filed Dec. 6, 2001, entitled the same as this application, the entire disclosure of which is hereby incorporated herein by reference. This application is also related to the application Ser. No. 60/338,372 entitled "Pseudo-Laminated Soft Underlayers for Perpendicular Magnetic Recording Media," which claims priority from Provisional Application Ser. No. 60/338,372 filed Dec. 6, 2001, the entire disclosure of which is hereby incorporated herein by reference.

FIELD OF INVENTION

This invention relates to perpendicular recording media with reduced DC noise, such as thin film magnetic recording disks for perpendicular recording, and to methods of manufacturing and using the media for DC noise reduction. The invention has particular applicability to high areal density magnetic recording media exhibiting low noise.

BACKGROUND

Figure 1:
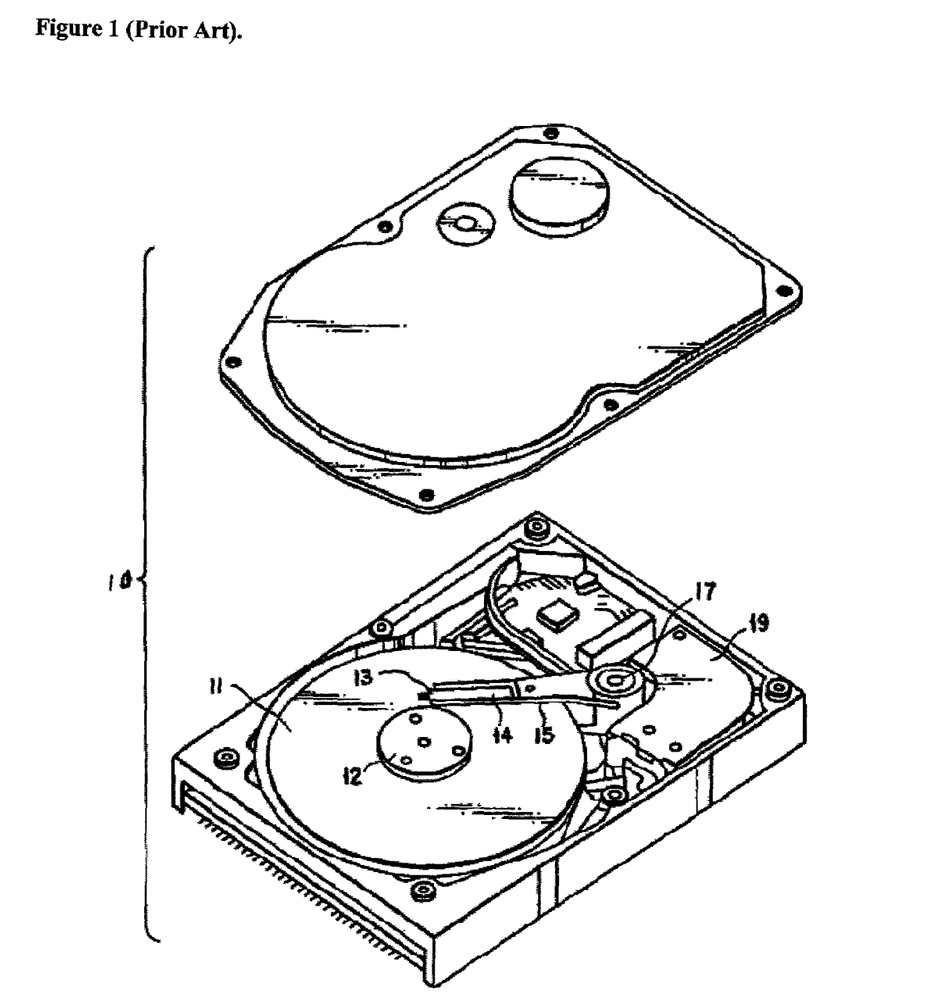
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. The rotary actuator could have several suspensions and multiple magnetic heads to allow for simultaneous recording and reproduction on and from both surfaces of each medium.

An electromagnetic converting portion (not shown) for recording/reproducing information is mounted on the magnetic head 13. The arm 15 has a bobbin portion for holding a driving coil (not shown). A voice coil motor 19 as a kind of linear motor is provided to the other end of the arm 15. The voice motor 19 has the driving coil wound on the bobbin portion of the arm 15 and a magnetic circuit (not shown). The magnetic circuit comprises a permanent magnet and a counter yoke. The magnetic circuit opposes the driving coil to sandwich it. The arm 15 is swingably supported by ball bearings (not shown) provided at the upper and lower portions of a pivot portion 17. The ball bearings provided around the pivot portion 17 are held by a carriage portion (not shown).

A magnetic head support mechanism is controlled by a positioning servo driving system. The positioning servo driving system comprises a feedback control circuit having a head position detection sensor (not shown), a power supply (not shown), and a controller (not shown). When a signal is supplied from the controller to the respective power supplies based on the detection result of the position of the magnetic head 13, the driving coil of the voice coil motor 19 and the piezoelectric element (not shown) of the head portion are driven.

The increasing demands for higher areal recording density impose increasingly greater demands on thin film magnetic recording media in terms of remanent coercivity (Hr), magnetic remanance (Mr), coercivity squareness (S*), remanent squareness (S), medium noise, i.e., signal-to-medium noise ratio (SMNR), and narrow track recording performance. It is extremely difficult to produce a magnetic recording medium satisfying such demanding requirements.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, media noise, including DC noise, must be minimized by suitable microstructure control.

According to the domain theory, a magnetic material is composed of a number of submicroscopic regions called domains. Each domain contains parallel atomic moments and is magnetized to saturation, but the directions of magnetization of different domains are not necessarily parallel. In the absence of an applied magnetic field, adjacent domains may be oriented randomly in any number of several directions, called the directions of easy magnetization, which depend on the geometry of the crystal. The resultant effect of all these various directions of magnetization may be zero, as is the case with an unmagnetized specimen. When a magnetic filed is applied, the domains most nearly parallel to the direction of the applied field grow in size at the expense of the others. This is called boundary displacement of the domains or the domain growth. A further increase in magnetic field causes more domains to rotate and align parallel to the applied field. When the material reaches the point of saturation magnetization, no further domain growth would take place on increasing the strength of the magnetic field.

The ease of magnetization or demagnetization of a magnetic material depends on the crystal structure, grain orientation, the state of strain, and the direction and strength of the magnetic field. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes.

In a perpendicular recording media, magnetization is formed easily in a direction perpendicular to the surface of a magnetic medium, typically a magnetic layer on a suitable substrate, resulting from perpendicular anisotropy in the magnetic layer. On the other hand, in a longitudinal recording media, magnetization is formed in a direction in a plane parallel to the surface of the magnetic layer, resulting from longitudinal anisotropy in the magnetic layer.

Figure 2:
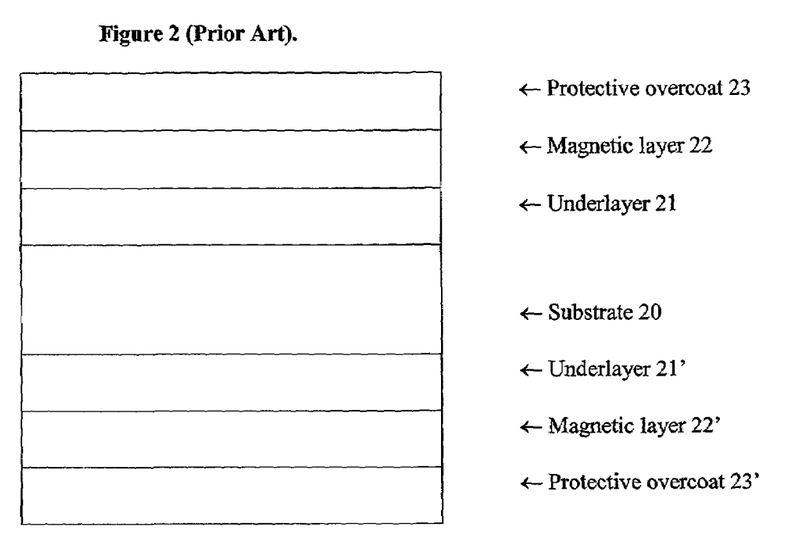
FIG. 2 is a schematic representation of the film structure in accordance with a magnetic recording medium of the prior art.

A cross sectional view of a longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer.

Figure 3:
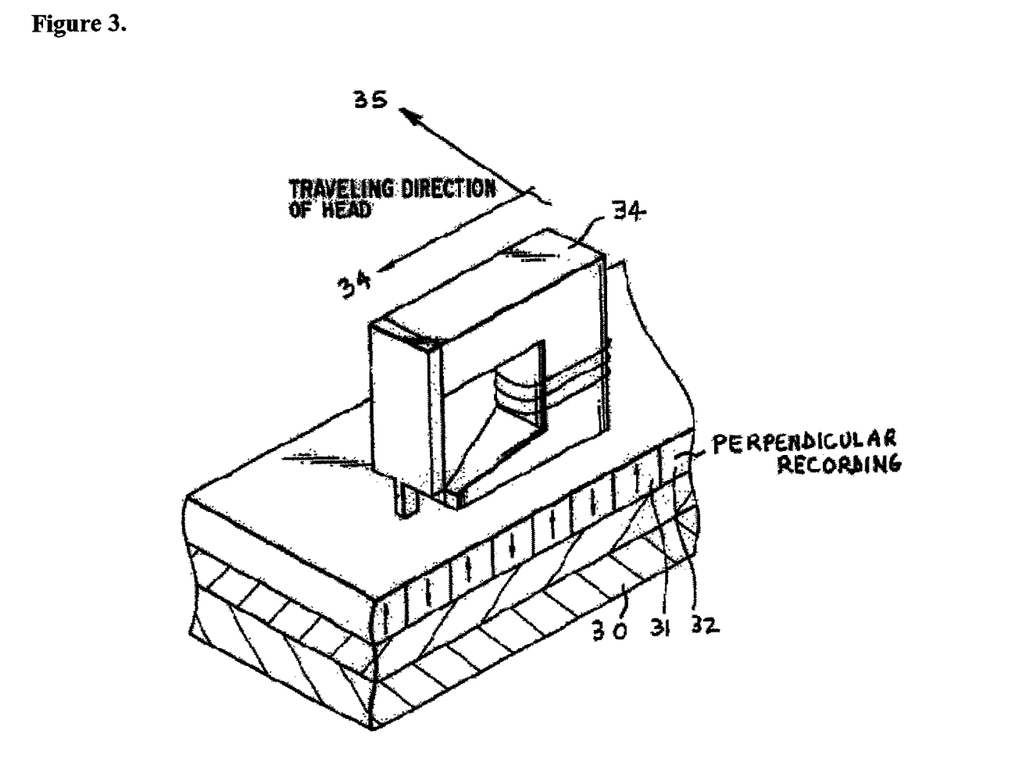
FIG. 3 is perspective view of a magnetic head and a magnetic disk of a perpendicular recording disk medium.

A perpendicular recording disk medium is shown in FIG. 3. It is similar to the longitudinal recording medium, but with the following differences. First, a perpendicular recording disk medium has soft magnetic underlayer 31 of an alloy such as Permalloy, which form predominantly a polycrystalline phase, instead of a Cr-containing underlayer typically used in a longitudinal recording media. Second, as shown in FIG. 3, magnetic layer 32 of the perpendicular recording disk medium comprises domains oriented in a direction perpendicular to the plane of the substrate 30. Also, shown in FIG. 3 are the following: (a) read-write head 33 located on the recording medium, (b) traveling direction 34 of head 33 and (c) transverse direction 35 with respect to the traveling direction 34.

Because a magnetic recording layer that is capable of perpendicular recording has domains (magnetic anisotropy) oriented in a direction perpendicular to the plane of the substrate, it is not capable of performing as a magnetic layer in a longitudinal recording medium. Similarly, because a magnetic recording layer that is capable of longitudinal recording has domains (magnetic anisotropy) oriented in a direction in the plane of the substrate, it is not capable of performing as a magnetic layer in a perpendicular recording medium. Besides, there exists no practically useable recording medium that is capable of working as a magnetic layer in both perpendicular and longitudinal recording media. An isotropic magnetic material is "theoretically" capable of working as a magnetic layer in both perpendicular and longitudinal recording media. However, an isotropic magnetic material, which lacks anisotropy, is never used in a magnetic recording medium as a magnetic recording layer because it lacks essential properties, such as high SMNR, of a magnetic recording layer.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material which comprises a mixture of amorphous and crystalline materials, and ceramic materials. Glass-ceramic materials do not normally exhibit a crystalline surface. Glasses and glass-ceramics generally exhibit high resistance to shocks.

The underlayer and magnetic layer are conventionally sequentially sputter deposited on the substrate, typically by magnetron sputtering, in an inert gas atmosphere such as an atmosphere of pure argon. A conventional carbon overcoat is typically deposited in argon with nitrogen, hydrogen or ethylene. Conventional lubricant topcoats are typically about 20 Å thick.

When soft underlayers are fabricated by magnetron sputtering on disk substrates, there are several components competing to determine the net anisotropy of the underlayers: effect of magnetron field, magnetostriction of film and stress originated from substrate shape, etc. A seedlayer, which is optionally added as a layer lying in between the substrate and the underlayer, can often control anisotropy of the underlayer by promoting microstructure that exhibit either short-range ordering under the influence of magnetron field or different magnetostriction. A seedlayer could also alter local stresses in the soft underlayer.

It is recognized that the magnetic properties, such as Hr, Mr, S* and SMNR, which are critical to the performance of a magnetic alloy film, depend primarily upon the microstructure of the magnetic layer which, in turn, is influenced by one or more underlying layers on which it is deposited. One form of a multiple underlayer containing perpendicular recording medium is a double-layer perpendicular recording medium that typically includes a substrate, a relatively thick soft underlayer (SUL), non-magnetic intermediate layer(s) and recording layer, in this order.

A "soft magnetic material" is a material that is easily magnetized and demagnetized. As compared to a soft magnetic material, a "hard magnetic" material is one that neither magnetizes nor demagnetizes easily. The problem of making soft magnetic materials conventionally is that they usually have many crystalline boundaries and crystal grains oriented in many directions. In such metals, the magnetization process is accompanied by much irreversible Block wall motion and by much rotation against anisotropy, which is usually irreversible. See *Mc-Graw Hill Encyclopedia of Science & Technology*, Vol. 5, 366 (1982). *Mc-Graw Hill Encyclopedia of Science & Technology* further states that the preferred soft material would be a material fabricated by some inexpensive technique that results in all crystal grains being oriented in the same or nearly the same direction. Id. Applicants, however, have found that "all grains" oriented in the same direction would be very difficult to produce and would not be the preferred soft material. In fact, applicants have found that very high anisotropy is not desirable.

It is important to reduce head-to-SUL spacing (HSS) and head-to-medium spacing (HMS) for high-density perpendicular recording. Smaller HSS and HMS allow efficient writing (recording) and reading, respectively. Using the thinnest possible intermediate, recording and protection layers also helps reduce HSS.

It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times the linear density (BPI) in terms of bits per inch.

The increasing demands for higher areal recording density impose increasingly greater demands on flying the head lower because the output voltage of a disk drive (or the readback signal of a reader head in disk drive) is proportional to 1/exp(HMS). Therefore, a smooth recording surface is preferred, as well as a smooth opposing surface of the associated transducer head, thereby permitting the head and the disk to be positioned in closer proximity with an attendant increase in predictability and consistent behavior of the air bearing supporting the head.

It is a general trend that the surface of thin films gets rougher as film thickness increases. Since soft underlayer thickness is relatively thick (200–400 nm), the surface of the SUL tends to be rough, which contributes to the roughness of the magnetic recording media. When the surface of the magnetic recording media is rough, it is difficult to fly a head close to the surface of media. Therefore, reducing the surface roughness of the SUL is critical for reducing the surface roughness of the magnetic recording media and, thus, to reduce HMS.

Perpendicular recording media having a thick SUL are subjected to perpendicular anisotropy components in SUL originating from stress or magnetic anisotropy, thereby, providing energy to form stripe and ripple domains, which results in DC noise. The terms "stripe and ripple domains" are explained in references: K. Sin et al., IEEE Trans. Magn. 33, 2833 (1997) and N. Sato et al., J. Phys. Soc. Japn. 19, 1116 (1964), which are incorporated herein by reference.

DC noise is noise originating from sources other than transition of recorded bits and, therefore, is independent of recording frequency.

This invention addresses the issues of surface roughness and DC noise of a high areal density, perpendicular magnetic recording medium by the use of an amorphous soft underlayer and their functional equivalents thereof.

SUMMARY OF THE INVENTION

The invention provides a perpendicular magnetic recording medium having high areal recording density exhibiting low DC noise. One way of achieving this goal is to produce an amorphous soft magnetic film in the perpendicular magnetic recording medium.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

This invention provides magnetic recording media suitable for high areal recording density exhibiting high SMNR. This invention achieves such technological advantages by forming an amorphous soft underlayer. The underlayer is "soft" because it made of a soft magnetic material, which is defined above, and it is called an "underlayer" because it resides under a recording layer. The term "amorphous" means that the material of the underlayer exhibits no peak in an X-ray diffraction pattern as compared to background noise. The "amorphous soft underlayer" of this invention encompasses nanocrystallites in amorphous phase or any other form of a material so long the material exhibits no peak in an X-ray diffraction pattern as compared to background noise.

In accordance with embodiments of this invention, the substrates that may be used in the invention include glass, glass-ceramic, NiP/aluminum, metal alloys, plastic/polymer material, ceramic, glass-polymer, composite materials or other non-magnetic materials.

Figure 4:
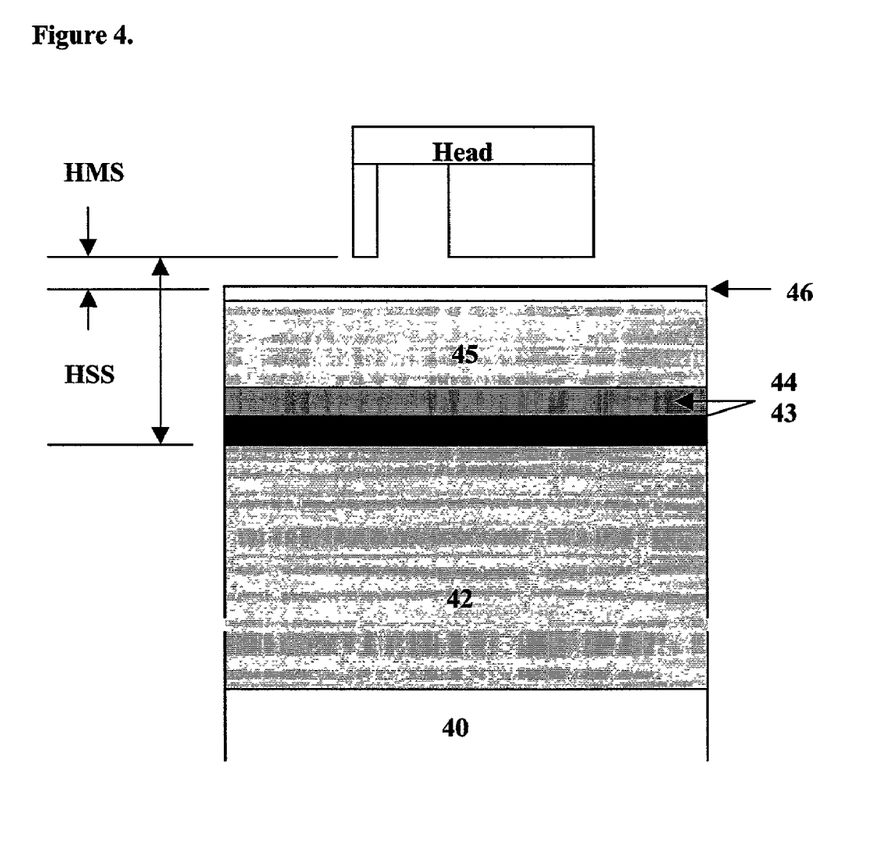
FIG. 4 is a schematic cross-sectional view of a doubled-layer perpendicular medium and a head that illustrates position head-to-SUL spacing (HSS) and head-to-medium spacing (HMS).

An embodiment of this invention is shown in FIG. 4, which shows a double-layer perpendicular medium having a relatively thick amorphous soft underlayer 42 on a substrate 40. On the underlayer 42 are deposited non-magnetic intermediate layers 43 and 44, above which are recording layer 45 and protection layer 46. Also, shown in FIG. 4 are the distances referred to as HMS and HSS. The intermediate layer 43 is typically Ru, a RuCr alloy, Ti, TiCr, while the intermediate layer 44 is CoCrX, wherein X is Pt, Ta, W, Mo, Ru.

Figure 5:
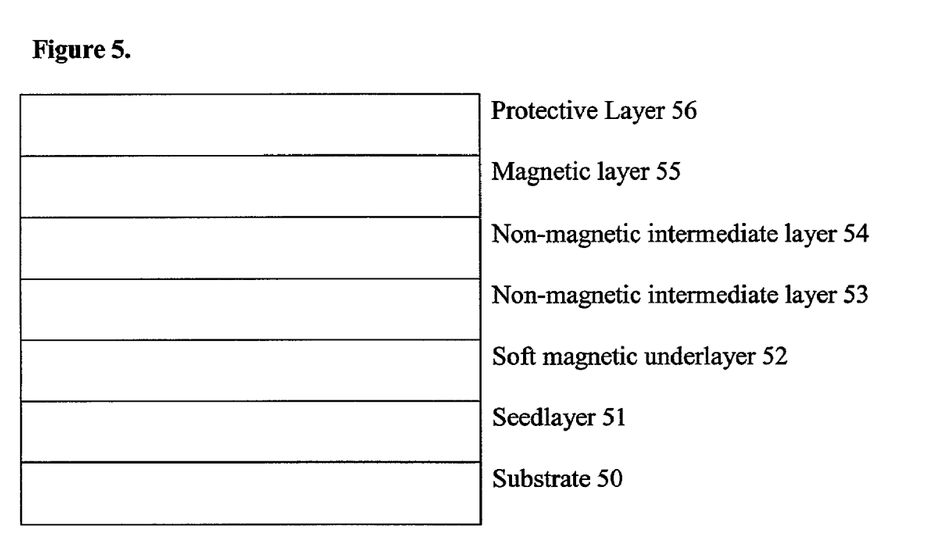
FIG. 5 is a schematic representation of the film structure in accordance with a magnetic recording medium of this invention.

A preferred embodiment of a perpendicular recording medium of this invention is shown in FIG. 5. The thickness of seedlayer 51 is about 0.1–20 nm, preferably, about 3–8 nm. The thickness of the amorphous soft magnetic underlayer 52 is about 100–400 nm, and the thickness of magnetic layer 55 deposited on the underlayer is about 10–20 nm. In between the amorphous soft magnetic underlayer 52 and the magnetic layer 55 could be intermediate layers 53 and 54 of thickness of about 5–10 nm. Protective layer 56 typically covers the magnetic layer 55.

A perpendicular recording medium of this invention comprises an amorphous soft underlayer and a recording layer. The amorphous soft underlayer should preferably be made of soft magnetic materials and the recording layer should preferably be made of hard magnetic materials. The amorphous soft underlayer is relatively thick compared to other layers. Any layers between the amorphous soft underlayer and the recording layer is called interlayer or intermediate layer. An interlayer can be made of more than one layer of non-magnetic materials. The purpose of the interlayer is to prevent an interaction between the amorphous soft magnetic underlayer and recording layer. An interlayer could also promote the desired properties of the recording layer. Longitudinal recording media do not have an amorphous soft magnetic underlayer. Therefore, the layers named as "underlayer," "seed layer," "sub-seed layer," or "buffer layer" of longitudinal media are somewhat equivalent to the intermediate layer(s) of perpendicular media.

Amorphous soft underlayers produced smoother surfaces as compared to polycrystalline underlayers. Therefore, it was recognized by this invention that the use of amorphous soft underlayer is one way of reducing the roughness of the magnetic recording media for high-density perpendicular magnetic recording. The amorphous soft underlayers materials include CoZrNb, CoTaZr, CoFeZr, FeCoZrB and FeCoB. Another advantage of amorphous materials as soft underlayer materials is the lack of long-range order in the amorphous material. Without a long-range order, amorphous alloys have substantially no magnetocrystalline anisotropy. According to this invention, the use of amorphous soft underlayer is one way of reducing noise caused by ripple domains.

The advantageous characteristics attainable by the present invention, particularly as related to reduction or elimination of DC noise, are illustrated in the following examples.

EXAMPLES

All samples described in this disclosure were fabricated with DC magnetron sputtering except carbon films were made with AC magnetron sputtering.

The surface parameters were measured by atomic force microscope (AFM). The AFM used for this invention has the trade name NanoScope.® The statistics used by the AFM are mostly derived from ASME B46.1 ("Surface Texture: Surface Roughness, Waviness and Law") available from the American Society of Mechanical Engineers, which is incorporated herein by reference.

In particular, the surface parameters are defined as follows:

(1) Average surface roughness ($R_a$): Arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|Z_1| + |Z_2| + \ldots + |Z_n|]/N$$

(2) RMS: This is the standard deviation of the Z values within the enclosed area and is calculated as $$RMS = [\{\Sigma(Z_i - Z_{avg})^2\}/N]^{1/2}$$

where $Z_{avg}$ is the average of the Z values within the enclosed area, $Z_i$ is the current Z value, and N is the number of points within the enclosed area. The RMS value is not corrected for tilt in the plane of the data; therefore, plane fitting or flattening the data will change this value.

(3) Maximum height ($R_{max}$): This is the difference in height between the highest and lowest points on the surface relative to the mean plane.

(4) $R_z$: This is the average difference in height between five highest peaks and five lowest valleys relative to the mean plane.

Spin stand measurements were performed on a Guzik 2585A/1701A test spin stand to quantify the amount of read-back noise of the amorphous soft layers. The SUL read-back noise was obtained in the following manner. A large band of the medium, 4000 μin, was DC erased. The time domain read-back signals were captured for 0.5 ms with a sampling rate of 1 Gs/s. The time domain read-back signals were converted to the frequency domain and further to the spatial frequency domain. The read-back noise was obtained by integrating the noise in the spatial frequency domain and normalizing by 600 kfci. The excess SUL-read-back noise was obtained by subtracting the integrated electronic noise from the integrated SUL read-back noise.

Comparison of Surface Roughness Between Amorphous and Crystalline Soft Underlayers.

A single-disk type of sputtering machine with multi-vacuum chamber was used to deposit the SUL films of the samples shown in Table 1. The SUL films were sputtered on glass substrates in argon gas pressure of 3 to 5 mtorr. The surface roughness of 200 nm the SUL films made of various materials are shown in Table 1. All of the SUL films shown in Table 1 were sputtered by DC-magnetron except for $NiFe_{55}$, which were sputtered by RF magnetron sputtering. Since the roughness of films could vary as the deposition rate changes, the deposition rates for the films are also shown in the Table. The roughness was measured by atomic force microscopy (AFM) technique from 10 μm×10 μm scans. The Ra values are averaged over 2 measurements for a minimum of 4 samples of each material. The roughness of the bare glass substrate was 0.25 nm. It is seen from the data that the amorphous SUL films, i.e., films exhibiting amorphous or nanocrystalline in amorphous structures, show consistently lower surface roughness than the SUL films having a polycrystalline structure.

TABLE 1

Average roughness (Ra) of various soft underlayer films measured by AFM. The film thickness in each example was 200 nm and the Ra of the glass substrate was 0.25 nm.

| SUL Material | Deposition Rate (nm/s) | Microcrystalline Phase | Ra (nm) |
|---|---|---|---|
| $NiFe_{40}$ | 6.3–8 | polycrystalline | 0.45–0.63 |
| $NiFe_{55}$ (RE) | 1.2 | polycrystalline | 0.93–1.63 |
| $CoZr_5Nb_4$ | 3.3–13 | amorphous | 0.2–0.24 |
| $(FeAl_2)N$ | 13.8 | polycrystalline | 1.1 |
| $FeCoB_{10}$ | 5.5–11 | nanocrystalline in amorphous | 0.29–0.34 |
| $FeCoB_{12}$ | 5.5–8.2 | amorphous | 0.21–0.27 |

(2) Comparison of DC Noise Between Amorphous and Crystalline Soft Underlayer Films.

Figure 6:
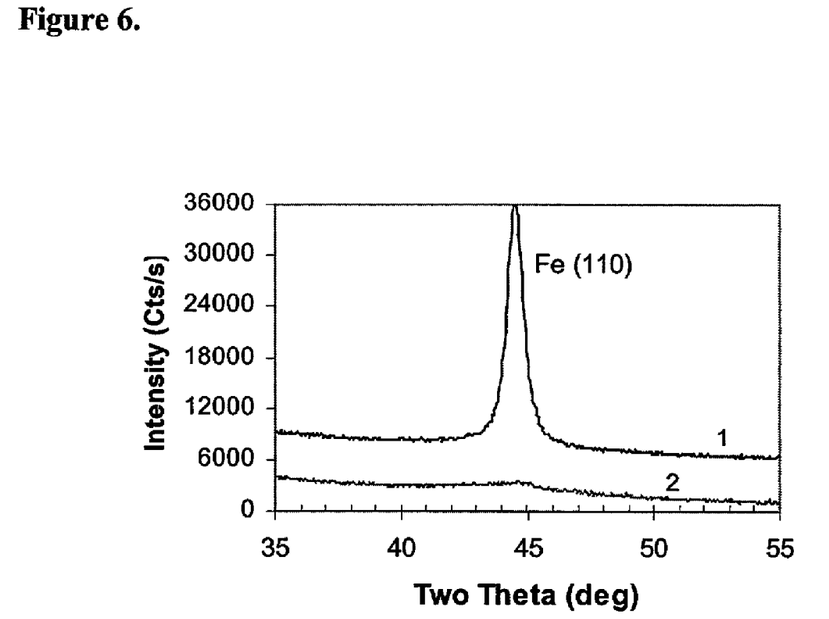
FIG. 6 shows X-ray diffraction patterns of the two $FeCoB_{12}$ SUL films. Sample 1 is crystallized, while Sample 2 is amorphous, therefore, exhibiting no texture.
Figure 7:
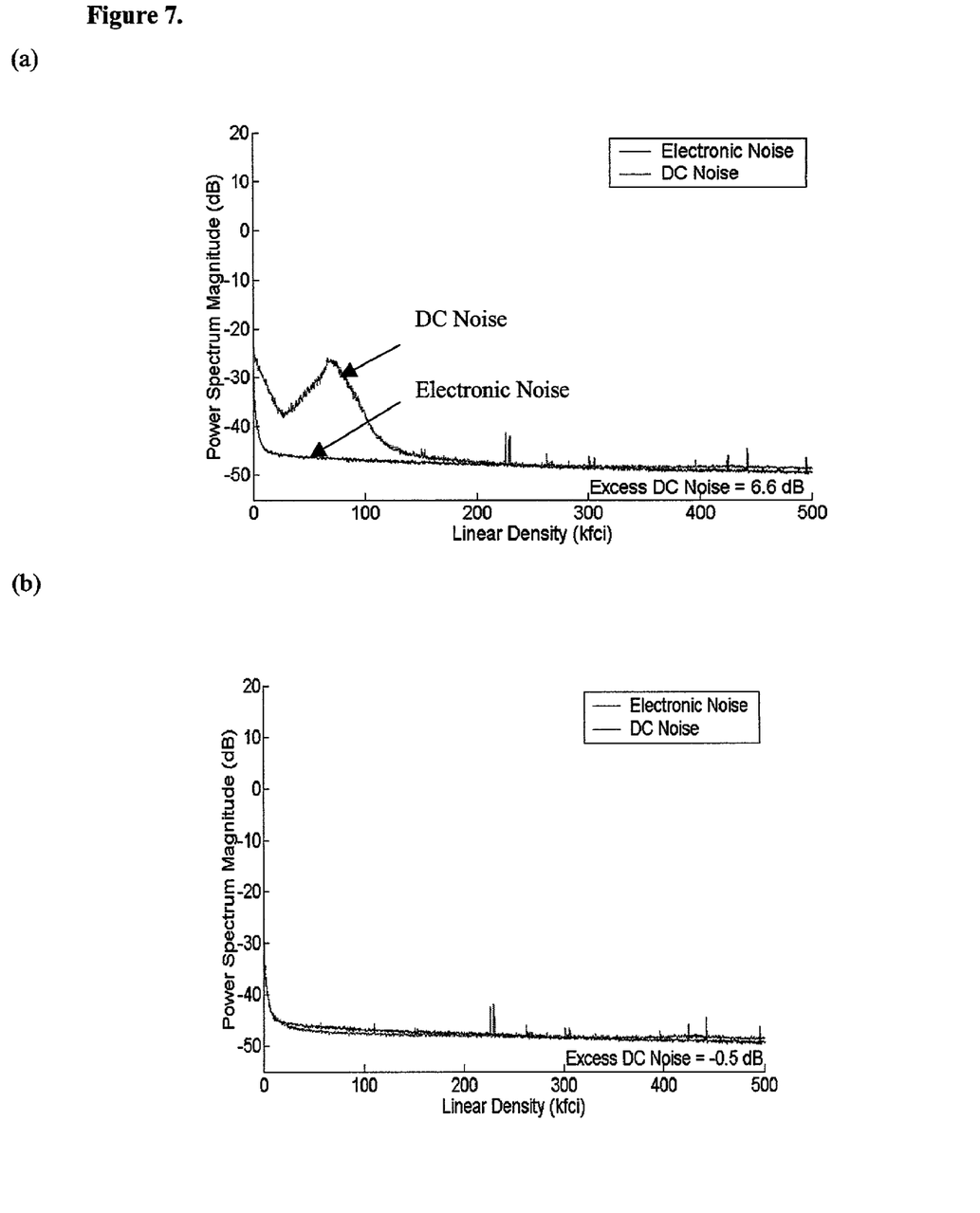
FIG. 7 shows noise spectra of two $FeCoB_{12}$ SUL films with (a) crystalline and (b) amorphous phase. The x-scale of both graphs (a) and (b) are off by a factor of 2; therefore, the correct values of x-scale is twice as that shown.

X-ray diffraction measurements indicated that the microstructural phase of FeCoB films could be controlled from amorphous to crystalline, and vice-versa, by varying the composition, the deposition or post-deposition annealing process conditions. In particular, two $(Fe_{65}Co_{35})_{88}B_{12}$ SUL films processed differently, Samples 1 and 2, were chosen as examples. Sample 1 had crystalline phase formed in amorphous matrix after annealing in a relatively severe conditions, and Sample 2 stayed in amorphous phase after annealing in mild conditions as shown by the X-ray diffraction patterns and noise spectrums in FIGS. 6 and 7, respectively, for the two samples.

Figure 8:
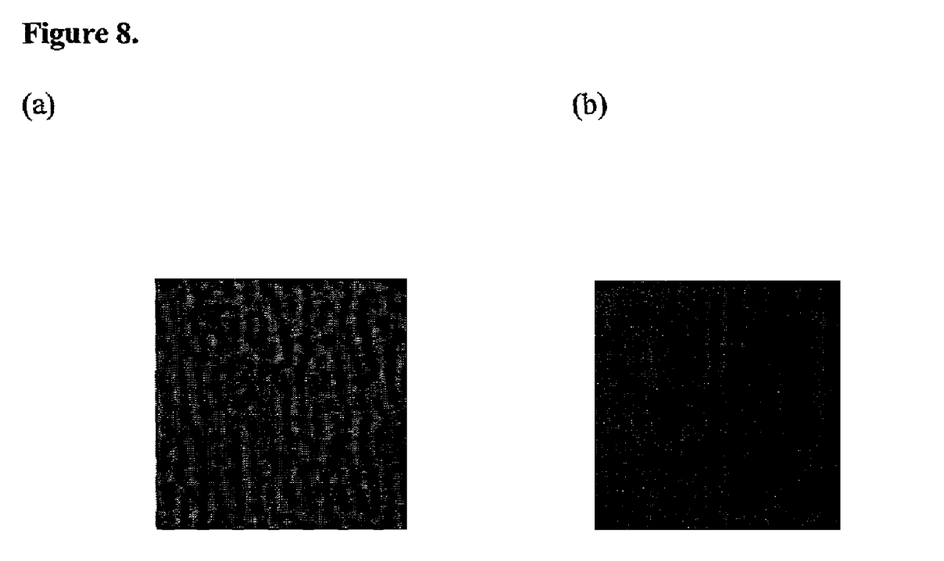
FIG. 8 shows MFM images of the two $FeCoB_{12}$ SUL films with (a) crystalline and (b) amorphous phase. The images are obtained by scanning 5 μm×5 μm of film surfaces. The period of the ripple domains in image (a) is estimated to be 362 nm.

Noise spectra were obtained by spin stand testing. The SUL with amorphous phase showed no or substantially no DC noise, while the one having a crystalline phase showed high DC noise in low frequency with a local maximum intensity at 140 kfci. These DC noises were considered to be from ripple domains shown in MFM images in FIG. 8. The MFM image of Sample 1 showed bright and dark contrast, while the image of Sample 2 was featureless. The period of the bright and dark contrast in the MFM image of Sample 1 was estimated to be 362 nm, which corresponds to linear densities between 1 and 140 kfci, depending on ripple orientation with respect to the track direction. The bright and dark contrasts were due to the magnetization canted up or down from the film plane. These domains are due to crystallization of the film. Crystallization results in local magnetic anisotropy varying in direction and magnitude, resulting in ripple domain formation.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

The invention claimed is:

1. A method for writing data in a perpendicular recording medium, comprising interposing an amorphous soft underlayer between a substrate and a magnetic recording layer for perpendicular recording, and writing data in the magnetic recording layer, wherein the amorphous soft underlayer reduces DC noise in the perpendicular recording medium, wherein the amorphous soft underlayer comprises FeCoB, and further wherein the amorphous soft underlayer has an average surface roughness (Ra) of less than 0.3 nm, wherein the amorphous soft underlayer is thicker than the magnetic recording layer.

2. The method of claim 1, wherein the amorphous soft underlayer has a thickness of about 100 to about 400 nm.

3. The method of claim 1, wherein the amorphous soft underlayer comprises a material that exhibits no peak in an X-ray diffraction pattern as compared to background noise.

4. The method of claim 1, wherein the amorphous soft underlayer comprises nanocrystallites in an amorphous phase.

5. The method of claim 1, wherein the amorphous soft underlayer comprises $FeCoB_z$, wherein z is about 10 to 15.

6. The method of claim 1, further comprising measuring DC noise of the perpendicular recording medium.

7. A magnetic recording medium, comprising a substrate, an amorphous soft underlayer and a magnetic layer for perpendicular recording, wherein the amorphous soft underlayer comprises a material selected from the group consisting of CoFeZr, FeCoZrB, FeCoB and combinations thereof, further the amorphous soft underlayer has a thickness of about 100 to about 400 nm, wherein the amorphous soft underlayer is thicker than the magnetic recording layer, further wherein the amorphous soft underlayer has an average surface roughness (Ra) of less than 0.3 nm.

8. A magnetic recording medium, comprising a substrate, an amorphous soft underlayer and a magnetic layer for perpendicular recording, wherein the amorphous soft underlayer comprises FeCoB, and further wherein the amorphous soft underlayer has an average surface roughness (Ra) of less than 0.3 nm, wherein the amorphous soft underlayer is thicker than the magnetic recording layer.

9. The medium of claim 7, wherein the amorphous soft underlayer comprises a material that exhibits no peak in an X-ray diffraction pattern as compared to background noise.

10. The medium of claim 7, wherein the amorphous soft underlayer comprises nanocrystallites in an amorphous phase.

11. The medium of claim 7, wherein the amorphous soft underlayer comprises a material selected from the group consisting of $FeCoB_z$, wherein z is about 10 to 15.

12. A magnetic recording medium, comprising a substrate, an amorphous soft underlayer and a magnetic layer for perpendicular recording, wherein the amorphous soft underlayer comprises a material selected from the group consisting of CoFeZr, FeCoZrB, FeCoB and combinations thereof, wherein the amorphous soft underlayer is thicker than the magnetic recording layer, further wherein the amorphous soft underlayer has an average surface roughness (Ra) of less than 0.3 nm.

13. The medium of claim 1, wherein the amorphous soft underlayer comprises nanocrystallites in an amorphous phase.

14. The medium of claim 8, wherein the amorphous soft underlayer comprises nanocrystallites in an amorphous phase.

15. The medium of claim 12, wherein the amorphous soft underlayer comprises nanocrystallites in an amorphous phase.

\* \* \* \* \*